G. W. BOWEN.
SHEET METAL BOLT.
APPLICATION FILED NOV. 16, 1911.
1,162,746.
Patented Dec. 7, 1915.
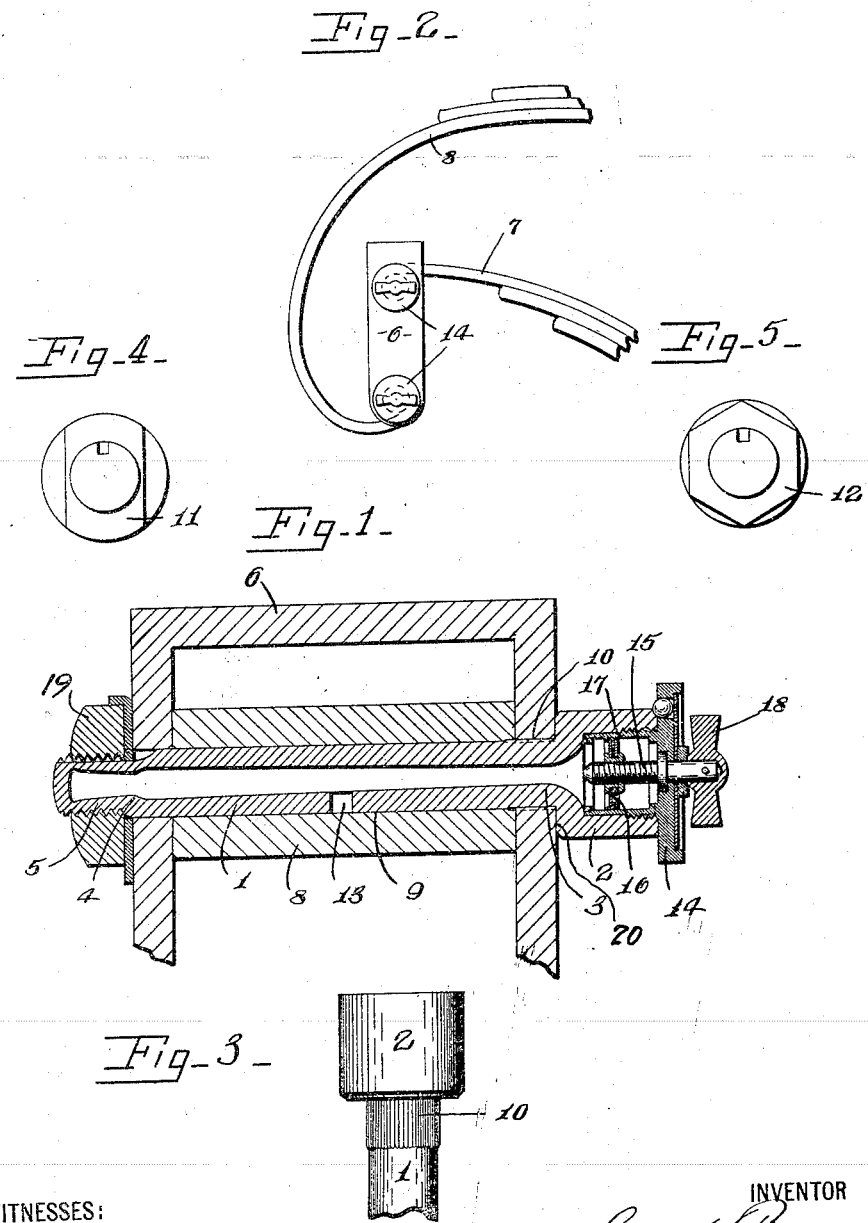

UNITED STATES PATENT OFFICE.

GEORGE W. BOWEN, OF AUBURN, NEW YORK.

SHEET-METAL BOLT.

1,162,746.   Specification of Letters Patent.   Patented Dec. 7, 1915.

Original application filed November 6, 1911, Serial No. 658,799. Divided and this application filed November 16, 1911. Serial No. 660,704.

*To all whom it may concern:*

Be it known that I, GEORGE W. BOWEN, of Auburn, in the county of Cayuga and State of New York, have invented a new and useful Sheet-Metal Bolt, of which the following is a specification.

This invention has for its object the production of a sheet metal bolt which is economical in manufacture and of great strength and durability in use; and it consists in the bolt embodying the novel features hereinafter set forth and claimed.

In describing this invention reference is had to the accompanying drawing in which like characters designate corresponding parts in all the views.

Figure 1 is a sectional view of one form of my sheet metal bolt, the contiguous parts of a spring and the link or shackle connecting the spring to another spring or to the body of a motor vehicle being shown. Fig. 2 is a fragmentary view of two vehicle springs connected by a shackle, each of the joints between the springs and the shackle being provided with my bolt. Fig. 3 is an elevation of the head and contiguous portion of the shank of the bolt shown in Fig. 1. Figs. 4 and 5 are end views looking lengthwise of the shank toward the head, illustrating slightly modified forms of my bolt.

This bolt, comprises, generally, an elongated tubular shank or body portion 1, and an integral tubular head 2 at one end of the shank, the head and shank being formed of sheet metal and the shank being compressed into a tube of less diameter than the head so that the walls of the tube are relatively thick, and the thickest portions of such walls are located adjacent the head at 3 and near the free end of the bolt as at 4, these thickened portions being located in such position as to strengthen the shank at the points the shearing strain is received by the shank as hereinafter set forth. The shank is also closed at its free end, and the portion thereof adjoining the closed end is compressed to form a thread receiving nipple 5, of less diameter than the major part of the shank, such compression thickening the walls of the nipple so that threads can be cut thereon and a groove for receiving a nut lock cut therein, without unduly weakening the bolt and also thickening the bolt adjacent the nipple, as at 4. Said shank or body portion 1 is preferably of greater length than the head 2 and is provided with a smooth peripheral wearing surface between the nipple 5 and the head, and with a lubricant conducting perforation 13 opening from the bore of the shank through said surface. The internal chamber of the head is preferably of materially greater diameter than the bore of the shank or body portion 1 and said chamber and bore are in open communication with each other.

6 is a link or shackle, such as usually connects springs 7 and 8 or connects one spring and the frame of a motor vehicle, each spring 7 or 8 having a bearing as 9 at one end on the spring bolt, such bearing 9 fitting between the opposite sides of the shackle 8, so that the shearing strain is transmitted to the shank of the bolt near the thickened and compressed points 3 and 4 of the walls of the bolt.

In order to prevent the bolt from turning relatively to the shackle it may be corrugated as shown at 10, Fig. 3, adjacent the head for fitting the opening in the shackle for the bolt, or as seen in Figs. 4 and 5, the bottom of the head of the bolt may be formed non-circular as at 11 and 12 for fitting correspondingly shaped sockets in the shackle 6. Endwise movement of the bolt relatively to its support, as the part 6, may be prevented by a nut 19 screwing on the nipple 5 and by the opposing end face 20 of the head 2.

By holding the bolt from turning the bearing 9 of the spring turns on the bolt during the movement of the spring, instead of the bolt turning in the shackle, and thus the bearing 9 receives the benefit of the lubricant passing through the perforation 13 in the bolt into the bearing.

I have here shown the head 2 of the bolt as provided with a closure 14 in the form of a receptacle threading into the head, the closure carrying means as a screw 15 which operates a plunger or follower 16 within the barrel portion 17 of the closure 14, and which is provided with a handle 18 outside the closure, the screw being in axial alinement with the bore of the bolt and being held from endwise movement relatively to the closure so that when it is turned the follower 16 will move either inwardly or outwardly within the barrel portion of the closure. The follower 16 tightly fits the barrel portion of the closure 14 so that it will not turn with the screw 15.

Heretofore spring bolts have been made by boring out a solid bolt and attaching a grease cup thereto. This bolt is a radically different article from any sheet metal article heretofore made.

The process by which this spring bolt is formed constitutes the subject-matter of my Patent No. 1,054,669, issued March 4, 1913, and this application is a division of the application resulting in said patent.

What I claim is:

1. As a new article of manufacture, a hollow bolt formed of sheet metal and comprising an elongated tubular shank and a head at one end of the shank, the shank being compressed into an elongated tube of less diameter, and having its walls of greater thickness, than the head, and the walls of the shank being of increased thickness adjoining the head, substantially as and for the purpose described.

2. As a new article of manufacture, a hollow spring bolt formed of sheet metal and comprising an elongated hollow shank, and a head at one end of the shank, the walls of the shank being of increased thickness near the head and the opposite end of the bolt for receiving shearing strain on the bolt, substantially as and for the purpose described.

3. As a new article of manufacture, a bolt adapted to be used as a spindle or axle and the like, the same being formed of sheet metal, and comprising a tubular shank, and a head at one end of the shank, the shank being closed at its other end and the portion thereof adjoining the closed end being compressed into a thread receiving nipple of less diameter than the major portion of the stem, the shank being compressed into a tube of less diameter, and having its walls of greater thickness than, the head, and the walls of the shank being of increased thickness adjoining the head and near the juncture of said reduced threaded portion and the major part of the shank, substantially as and for the purpose set forth.

4. A lubricant bolt struck from sheet metal and including a cup-shaped head, a hollow cylindrical shank closed at the end thereof remote from the head, the free end portion of the shank being reduced so that it is of less diameter than the major part of the shank, the shank having an outlet leading from its interior and through its periphery, the wall of the shank gradually thickening from the reduced end portion toward the head and being thickest at the juncture of the head of the shank, and the wall of said reduced portion thickening from the free end of the reduced portion toward the major part of the shank and being thickest at the juncture of the said reduced portion and the major part of the shank and the shank meeting the head at substantially a right angle whereby a shoulder is provided on the bottom of the head, and means for compressing lubricant in the head, substantially as and for the purpose described.

In testimony whereof, I have hereunto signed my name in the presence of two attesting witnesses, at Syracuse, in the county of Onondaga, in the State of New York, this 1st day of November 1911.

GEORGE W. BOWEN.

Witnesses:
SOPHIA DAVIS,
LILLIAN M. DAVIS.